UNITED STATES PATENT OFFICE 2,507,526

AZO CATALYSTS IN THE PREPARATION OF OLEFIN-SULFUR DIOXIDE RESINS

Ralph Albert Jacobson, Landenberg, Pa., assignor to E. I. du Pont de Nemours & Company, Wilmington, Del., a corporation of Delaware No Drawing. Application May 21, 1946,
Serial No. 671,389

6 Claims. (Cl. 260—79.3)

This invention relates to polymeric products and more particularly to an improved process for the preparation of olefin polysulfones.

Polymers prepared from olefins and sulfur dioxide are usually light-colored plastics and are of particular interest in view of the fact that the raw materials used for their preparation are abundant and cheap. Methods of preparing these polymers, however, have not produced good quality polymers in high yield.

It is an object of this invention to provide a process for the preparation of olefin polysulfones in high yield. A further object is the provision of new catalysts for this polymerization. Other objects will appear hereinafter.

These objects are accomplished by the following invention wherein an olefinic hydrocarbon having hydrogen on doubly bonded carbon is reacted with sulfur dioxide in the presence of an azo compound having both the valences of the azo, —N=N—, group attached to different carbons aliphatic in character, preferably tertiary, and preferably further attached to a neutral group hydrolyzable to the carboxyl group, i. e. to a nitrile, carboalkyoxy, or carbonamido group. The azo catalyst is preferably wholly aliphatic.

The reaction is readily carried out at temperatures up to 200° C. by mixing the olefin with a small amount of the azo compound in the presence of sulfur dioxide. The following examples, in which the parts given are by weight, further illustrate the process of this invention.

Example I

A glass-lined pressure vessel was flushed with nitrogen, cooled to about −20° C., and 95 parts of sulfur dioxide and 1 part of alpha, alpha'-azodiisobutyronitrile added. The vessel was then flushed with nitrogen and pressured to 300 lbs./sq. in. with ethylene. This mixture was efficiently agitated and heated to 65° C. The pressure was maintained at 1000 lbs. by repressuring with ethylene until no further absorption of gas occurred. The total reaction time was about 8 hours. A quantitative yield of ethylene sulfone polymer was produced as an almost white powder. Analysis of the polymer was: Found: C, 25.84, H, 4.55, S, 33.19; calculated for $(C_2H_4SO_2)_n$, C, 26.08, H, 4.34, S, 34.78.

Example II

A glass-lined pressure vessel was flushed with nitrogen and cooled to about −20° C. and 95 parts of sulfur dioxide and 1 part of alpha,-alpha'-azodiisobutyronitrile were added to the vessel, which was then flushed again with nitrogen and charged with ethylene under 300 lbs./sq. in. pressure. This mixture was agitated by rocking at 30–35° C. and was maintained at 600 lbs./sq. in. by the addition of ethylene under pressure as needed. The reaction was complete when the absorption of ethylene ceased, and required a period of about 14 hours. A white powdery ethylene polysulfone was obtained in good yield. Films were molded at 200° C. and 6000 lbs./sq. in. but were not completely fused.

Example III

A glass-lined pressure vessel was flushed with nitrogen and cooled to about −20° C. and 95 parts of sulfur dioxide and 1 part of alpha,-alpha'-azodiisobutyronitrile were added to the vessel, which was flushed again with nitrogen. A total of 415 parts propylene was then added and the vessel was closed and agitated at 65° C. for about 6 hours under a pressure of 160–560 lbs./sq. in. A white, powdery, polymeric product was obtained in 87.5% yield, which was insoluble in solvents such as xylene, benzene, acetone, ethyl alcohol, and diethyl ether, but soluble in dimethylformamide and tetramethylene cyclic sulfone.

Example IV

A glass pressure vessel was cooled to about −50° C. and 40 parts of butene-2, 1 part alpha,-alpha'-azodiisobutyronitrile, and 76 parts sulfur dioxide were added. The vessel was flushed with nitrogen, closed, and allowed to come to room temperature. After standing two days, a white, solid, polymeric product had formed which was soluble in dioxane. An 87% yield was obtained.

Example V

A white, solid, polymeric product was obtained from isobutylene, using the same proportions and procedure as in Example IV.

Example VI

Isoheptane was used in essentially the proportions and procedure of Example IV. After opening the pressure vessel and evaporating the excess sulfur dioxide, two liquid layers formed. Removal of the unreacted isoheptene gave the solid, polymeric sulfone.

The olefins that may be used in the process of this invention are those of the formula $C_nH_{2n}$ having at least one hydrogen attached to one of the carbons bearing ethylenic unsaturation. In general, olefines of the formula $C_nH_{2n}$ where $n$ is an integer from 2 to 10, i. e. ethylene to decene-1, are most available and readily utilizable in the process of this invention. The olefins can be further represented by the formula $CRH=CR_1R_2$ where $R$, $R_1$, and $R_2$ are hydrogen or alkyl radicals which together preferably have not more than eight carbons. While the higher olefins are operable they do not give as good yields.

In the process of this invention there are generally applicable azo compounds having both valences of the azo, —N=N—, group attached to carbons aliphatic in character and preferably tertiary. Wholly aliphatic azo compounds are preferred and of these the azo compounds having the azo group attached to tertiary carbons aliphatic in character, further attached to a neutral group hydrolyzable to carboxyl, i. e., nitrile, carbalkoxy, or carbonamido, are more preferred. These neutral groups are bonded to the —N=N— group from carbon of the neutral group and the remaining valences of said carbon are satisfied by elements of atomic number from seven to eight, i. e. oxygen and nitrogen. Examples of the azo catalysts are alpha,alpha'-azobis(alpha,gamma-dimethylvaleronitrile), dimethyl and diethyl alpha,alpha' - azodiisobutyrates, 1,1'-azodicyclohexanecarbonitrile, alpha,alpha' - azobis(alphamethylbutyronitrile), alpha,alpha'-azobis(alphaethylbutyronitrile), and alpha,alpha' - azodiisobutyrocarbonamide. The more active of these catalysts have a negative group such as the nitrile, carbalkoxy, or carbonamido group attached to the carbons bonded to the —N=N— group. The catalyst is usually present in amount of from 0.01 to 5% based on total weight of olefin and sulfur dioxide.

The azo compounds may be prepared by the methods disclosed in the literature, e. g., Dox, J. Am. Chem. Soc. 47 1471-1477; Thiele and Heuser Ann. 290 1-40 (1896); Hartmann Rec. trav. chim. 46 150-153 (1927); Alderson and Robertson Serial No. 736,586, filed March 22, 1947, now U. S. Patent 2,469,358.

The temperature for the polymerization may be from 0° to 200° C., although, in general, temperatures of from 50 to 100° are usually preferred, since the catalyst is more effective at such temperatures. The properties of the polysulfone may be varied within wide limits, depending upon the olefins employed. For example, when mixed olefins are used, the properties of the resulting polymer are usually different from those of the polymers produced by a single olefin and sulfur dioxide.

The polysulfones are useful for the preparation of certain molded products, and they may be employed as fillers in other compositions.

The foregoing detailed description has been given for clearness of understanding only and no unnecessary limitations are to be understood therefrom. The invention is not limited to the exact details shown and described for obvious modifications will occur to those skilled in the art.

What is claimed is:

1. In the process of making solid polymers from sulfur dioxide and olefins having hydrogen on doubly bonded carbon, the improvement wherein the sulfur dioxide is reacted with the olefin component in the presence of, as a catalyst, an aliphatic azo compound having both valances of the azo, —N=N—, group joined to different tertiary carbon atoms each further bonded to a group of the class consisting of the nitrile, carboalkoxy, and carbonamido groups.

2. In the process of making solid polymers from sulfur dioxide and olefins having hydrogen on doubly bonded carbon, the improvement wherein the sulfur dioxide is reacted with the olefin component in the presence of, as a catalyst, an azo compound wherein the azo, —N=N—, group is attached to different carbons aliphatic in character, each further bonded to a nitrile group.

3. In the process of making solid polymers from sulfur dioxide and olefins having hydrogen on doubly bonded carbon, the improvement wherein the sulfur dioxide is reacted with the olefin component in the presence of, as a catalyst, alpha,alpha'-azodiisobutyronitrile.

4. In the process of making solid polymeric material from sulfur dioxide and ethylene the improvement which comprises reacting the sulfur dioxide and ethylene in the presence of, as a catalyst, an aliphatic azo compound having both valences of the azo, —N=N—, group joined to different tertiary carbon atoms each further bonded to a group of the class consisting of the nitrile, carboalkoxy, and carbonamido groups.

5. In the process of making solid polymeric material from sulfur dioxide and ethylene the improvement which comprises reacting the sulfur dioxide and ethylene in the presence of, as a catalyst, an aliphatic azo compound having both valences of the azo, —N=N—, group joined to different tertiary carbon atoms each further bonded to a nitrile group 6. In the process of making solid polymeric material from sulfur dioxide and ethylene the improvement which comprises reacting the sulfur dioxide and ethylene in the presence of alpha,-alpha'-azodiisobutyronitrile as catalyst.

RALPH ALBERT JACOBSON.

No references cited.